United States Patent
Shedlock et al.

(10) Patent No.: US 12,092,774 B2
(45) Date of Patent: Sep. 17, 2024

(54) METHOD FOR FABRICATING PIXELATED SCINTILLATORS

(71) Applicant: Varian Medical Systems, Inc., Palo Alto, CA (US)

(72) Inventors: Daniel Shedlock, Knoxville, TN (US); Josh Star-Lack, Palo Alto, CA (US); Richard Mead, Los Altos Hills, CA (US)

(73) Assignees: VARIAN MEDICAL SYSTEMS, INC., Palo Alto, CA (US); COLLIMATED HOLES, INC., Campbell, CA (US)

( * ) Notice: Subject to any disclaimer, the term of this patent is extended or adjusted under 35 U.S.C. 154(b) by 74 days.

(21) Appl. No.: 17/480,220

(22) Filed: Sep. 21, 2021

(65) Prior Publication Data

US 2022/0003882 A1 Jan. 6, 2022

Related U.S. Application Data

(62) Division of application No. 15/978,924, filed on May 14, 2018, now abandoned, which is a division of
(Continued)

(51) Int. Cl.
*G01T 1/20* (2006.01)
*B29C 39/02* (2006.01)
(Continued)

(52) U.S. Cl.
CPC .......... *G01T 1/2002* (2013.01); *B29C 39/026* (2013.01); *B29C 39/26* (2013.01);
(Continued)

(58) Field of Classification Search
CPC ................. G01T 1/2018; G01T 1/20183
See application file for complete search history.

(56) References Cited

U.S. PATENT DOCUMENTS

| | | | |
|---|---|---|---|
| 3,654,172 A | 4/1972 | Reade | |
| 4,982,096 A * | 1/1991 | Fujii | G01T 1/20183 250/366 |

(Continued)

FOREIGN PATENT DOCUMENTS

| | | |
|---|---|---|
| CN | 1541621 A | 11/2004 |
| CN | 1958495 A | 5/2007 |

(Continued)

OTHER PUBLICATIONS

USPTO, Office Action in U.S. Appl. No. 16/283,440 dated Dec. 14, 2020.
(Continued)

*Primary Examiner* — David P Porta
*Assistant Examiner* — Shun Lee
(74) *Attorney, Agent, or Firm* — Harness, Dickey & Pierce, P.L.C.

(57) ABSTRACT

In a method of making pixelated scintillators, an amorphous scintillator material in a molten state is pressed into a plurality of cavities defined by a plurality of walls of a mesh array. The molten scintillator material in the plurality of cavities is cooled to form a pixelated scintillator array. An x-ray imager including a pixelated scintillator is also described.

11 Claims, 5 Drawing Sheets

Related U.S. Application Data application No. 14/870,044, filed on Sep. 30, 2015, now abandoned.

(51) Int. Cl.

| | | |
|---|---|---|
| *B29C 39/26* | (2006.01) | |
| *B29C 39/38* | (2006.01) | |
| *B29C 65/48* | (2006.01) | |
| *C03B 11/08* | (2006.01) | |
| *C03B 19/02* | (2006.01) | |
| *C03B 37/02* | (2006.01) | |
| *C03B 37/025* | (2006.01) | |
| *C03C 4/08* | (2006.01) | |
| *G01T 1/202* | (2006.01) | |
| *B29K 25/00* | (2006.01) | |
| *B29K 105/16* | (2006.01) | |

(52) U.S. Cl.
CPC .............. *B29C 39/38* (2013.01); *B29C 65/48* (2013.01); *C03B 11/08* (2013.01); *C03B 19/02* (2013.01); *C03B 37/02* (2013.01); *C03B 37/025* (2013.01); *C03C 4/087* (2013.01); *G01T 1/20* (2013.01); *G01T 1/20183* (2020.05); *G01T 1/20187* (2020.05); *G01T 1/202* (2013.01); *B29K 2025/00* (2013.01); *B29K 2105/162* (2013.01); *C03B 2215/06* (2013.01); *C03B 2215/07* (2013.01); *C03B 2215/16* (2013.01); *C03B 2215/20* (2013.01); *C03B 2215/414* (2013.01); *C03B 2215/79* (2013.01)

(56) References Cited

U.S. PATENT DOCUMENTS

| | | | |
|---|---|---|---|
| 5,108,959 A | 4/1992 | Buchanan et al. | |
| 5,120,970 A | 6/1992 | Buchanan et al. | |
| 5,122,671 A | 6/1992 | Buchanan et al. | |
| 5,391,320 A | 2/1995 | Buchanan et al. | |
| 5,496,502 A | 3/1996 | Thomson | |
| 5,970,115 A | 10/1999 | Colbeth et al. | |
| 6,541,774 B1 | 4/2003 | DeJule et al. | |
| 6,967,330 B1 | 11/2005 | Lempicki et al. | |
| 7,157,014 B1 | 1/2007 | Andreaco et al. | |
| 7,291,842 B2 | 11/2007 | Zentai et al. | |
| 7,816,651 B2 | 10/2010 | Green | |
| 8,204,171 B2 | 6/2012 | Ikhlef | |
| 8,552,386 B2 | 10/2013 | Morf et al. | |
| 2002/0079455 A1 | 6/2002 | Wieczorek | |
| 2003/0021374 A1 | 1/2003 | Venkataramani et al. | |
| 2003/0128812 A1 | 7/2003 | Appleby et al. | |
| 2003/0169847 A1* | 9/2003 | Karellas ............ | A61B 6/482 378/98.3 |
| 2004/0042585 A1 | 3/2004 | Nagarkar et al. | |
| 2004/0140431 A1 | 7/2004 | Schmand et al. | |
| 2004/0218712 A1 | 11/2004 | Jiang et al. | |
| 2004/0251420 A1 | 12/2004 | Sun | |
| 2005/0029462 A1 | 2/2005 | Lyons et al. | |
| 2005/0104000 A1 | 5/2005 | Kindem et al. | |
| 2006/0054863 A1 | 3/2006 | Dai et al. | |
| 2006/0108533 A1 | 5/2006 | McEvoy et al. | |
| 2007/0085010 A1 | 4/2007 | Letant et al. | |
| 2009/0294683 A1 | 12/2009 | Perna | |
| 2010/0032578 A1 | 2/2010 | Levene et al. | |
| 2010/0127180 A1 | 5/2010 | Lifshitz et al. | |
| 2010/0155610 A1 | 6/2010 | Menge et al. | |
| 2011/0110490 A1 | 5/2011 | Samant et al. | |
| 2012/0087465 A1 | 4/2012 | Ikhlef | |
| 2012/0144869 A1 | 6/2012 | Tabor | |
| 2012/0223252 A1 | 9/2012 | Menge | |
| 2012/0312995 A1 | 12/2012 | Morf et al. | |
| 2013/0034715 A1 | 2/2013 | Peng et al. | |
| 2013/0153776 A1 | 6/2013 | Wieczorek et al. | |
| 2013/0193331 A1 | 8/2013 | Perna | |
| 2014/0110594 A1 | 4/2014 | Star-Lack et al. | |
| 2014/0264043 A1 | 9/2014 | Ganguly et al. | |
| 2014/0367553 A1 | 12/2014 | Selfe | |
| 2015/0003584 A1 | 1/2015 | Weisfield et al. | |
| 2015/0241570 A1 | 8/2015 | Perna | |
| 2015/0331117 A1 | 11/2015 | Ho et al. | |
| 2015/0338529 A1 | 11/2015 | Svenonius et al. | |
| 2016/0121139 A1 | 5/2016 | Da Silva Rodrigues et al. | |
| 2017/0097424 A1 | 4/2017 | Shedlock et al. | |
| 2017/0131414 A1 | 5/2017 | Perna | |
| 2017/0285183 A1 | 10/2017 | Shedlock et al. | |

FOREIGN PATENT DOCUMENTS

| | | | | |
|---|---|---|---|---|
| CN | 102440794 A | 5/2012 | | |
| CN | 102617040 A | 8/2012 | | |
| CN | 104058578 A | 9/2014 | | |
| CN | 104903745 A | 9/2015 | | |
| CN | 104926122 A | 9/2015 | | |
| EP | 2733189 A1 * | 5/2014 | ............ | A61B 6/037 |
| JP | 05-100035 A | 4/1993 | | |
| JP | 2001228253 A | 8/2001 | | |
| JP | 2012-194009 A | 10/2012 | | |

OTHER PUBLICATIONS

European Patent Office, Supplemental Partial European Search Report in European application No. 16 85 2307.4, May 7, 2019.

USPTO, Office Action in U.S. Appl. No. 15/089,422 dated Oct. 11, 2017.

USPTO, Office Action in U.S. Appl. No. 15/089,422 dated Oct. 25, 2018.

USPTO, Office Action in U.S. Appl. No. 14/874,285 dated Oct. 12, 2017.

Hidnert et al. Thermal expansion of tungsten, Scientific Papers of the Bureau of Standards vol. 20 (Aug. 1925), pp. 483-487.

Saint Gobain Industrial Ceramics, Inc. BC-400/BC-404/BC-408/BC-412/BC-416 Premium Plastic Scintillators Data Sheet, Mar. 1998.

Achtziger et al. Tungsten in silicon carbide: Band-gap states and their polytype dependence, Physical Review B vol. 62, No. 19 (Nov. 2000), pp. 12888-12895.

PCT, International Search Report and Written Opinion in PCT/US2016/052236, Jan. 3, 2017, 22 pages.

\* cited by examiner

METHOD FOR FABRICATING PIXELATED SCINTILLATORS

TECHNICAL FIELD

Embodiments of this disclosure relate generally to x-ray imaging apparatuses and methods. In particular, various embodiments of methods of fabricating pixelated scintillators and image detectors containing pixelated scintillators are described.

BACKGROUND

X-ray image detectors are widely used in medical imaging, security inspection, scientific research, and other industries. An x-ray image detector may include a scintillator layer and a detector array. The scintillator layer absorbs incident x-ray radiation indicative of the structure of a subject imaged and converts the absorbed radiation into light photons. The detector array may collect light photons generated and convert them into measurable electrical signals, which may be amplified, digitized, or further processed by various electrical circuitry and algorithms known in the art. The detector array may include addressable photosensitive elements such as photodiodes and switching transistors such as TFT or CMOS transistors.

To improve the spatial resolution of images, light photons generated in the scintillator layer should ideally be recorded by the detector elements located vertically beneath the scintillators that generate the light photons. Crosstalk between pixels should be kept to a minimum. To accomplish that, pixelated scintillators, which can limit lateral spread of light photons, are used. Conventionally, a pixelated scintillator is formed by a "slice and dice" approach. A block of a scintillator crystal is cut into slices that may or may not be polished. The slices are applied with a layer of reflective septa or coating and reassembled against each other, now separated by the reflective septa. The assembly is then rotated 90 degrees and the block is again sliced, coated, and reassembled. The final pixelated array then has square or rectangular "pixels" surrounded by reflective septa on all four sides.

The conventional approach of preparing pixelated scintillators is labor intensive and the cost for large area pixelated scintillators is prohibitive. There is a need for innovative and more efficient methods for fabricating pixelated scintillators.

SUMMARY

Certain embodiments of a method of making pixelated scintillators are set forth below. It should be understood that these embodiments are presented merely to provide the reader with a brief summary of certain forms the invention might take and that these embodiments are not intended to limit the scope of the invention. Indeed, the invention may encompass a variety of embodiments or aspects that may not be set forth below.

In an exemplary embodiment of a method for fabricating pixelated scintillator array, a molten scintillator material may be poured into the hollow cavities of a mesh array with reflective walls. Alternatively, a molten scintillator material may be pressed into the hollow cavities of a mesh array with reflective walls. The assembly may be then cooled and annealed, leaving a rigid pixelated scintillator array in place. The scintillator material may be an amorphous material such as a scintillating glass with a thermal expansion coefficient similar to the thermal expansion coefficient of the mesh material. The pixel pitches may range from about 0.05 mm to about 40 mm depending upon applications.

Exemplary scintillator materials include borate and silicate glasses doped with rare earths such as cerium and terbium to optimize the wavelength of the emitted light to the detector array. For example terbium doped scintillator are typically in the green spectrum, around 550 nm, near the optimal level for amorphous silicon (a-Si) detector arrays. Other scintillator materials include scintillating nanospheres that are embedded in the glass. The nanospheres may have diameters significantly smaller than the wavelength of the emitted light. Further scintillator materials include plastic scintillators with various dopant materials such as poly vinyl toluene (PVT). In general, any scintillator materials that melt below the melting temperature of the mesh grid can be used.

The mesh may be made from a material with a melting temperature higher than the melting temperature of the scintillator material. The mesh walls can be constructed from metals or metal alloys, ceramics, or other suitable materials, and may be coated with a reflective layer.

Exemplary metals or metal alloys suitable for making the mesh include and are not limited to Cupronickel, Hastalloy C, Inconel, Iridium, Iron, Monel, Molybdenum, Steel, Steel and Carbon alloys, Tantalum, Thorium, Titanium, Tungsten, Vanadium, Zirconium. The metals or metal alloys may be coated with a diffuse or Lambertian reflective paint such as $TiO_2$. They may also be coated with an efficient specular reflector such as silver, gold or aluminum depending on the melting temperature of the glass.

Exemplary ceramics suitable for making the mesh include and are not limited to $HfB_2$, HfC, NfN, $ZrB_2$, ZrC, ZrN, $TiB_2$, TiC, TiN, $TaB_2$, TaC, TaN, SiC. It is desired that the ceramic be white or have a color matching the wavelength(s) of the emitted light from the scintillator. Alternatively, the ceramic may be coated with a paint such as $TiO_2$ or a metal. Other exemplary materials suitable for making the mesh include graphite, silicon carbide, or boron nitride.

In an alternative embodiment of a method for fabricating pixelated scintillators, scintillator "pixels" or pieces may be drawn using a standard glass draw technique. The drawn pixels may optionally be fire polished. The pixels can then be assembled into an array with reflective walls. One way of achieving this is to insert the drawn pixels into a mesh array with cavities. In this case, the melting temperature of the mesh array does not have to be very high and in addition to the metals listed above for a mesh array, it is possible to use other metals with high reflectivity such as aluminum. It may be desired that the scintillator pixels be drawn into cylinders to maximize the area of the air-glass interface, thus maximizing the differences in index of refraction between the glass and its surroundings to enhance the probability for total internal reflection. The pixels may also be hexagon or triangular in applications where a high fill factor is desired. A potting material or glue may be melted in to hold the pixels in place. It is desirable that the glue, adhesive or other bonding adhesives have optical properties that maximize internal reflection. This can be accomplished with either a reflective surface, index of refraction or both.

Other aspects and embodiments of the disclosure are described in the section of Detailed Description.

BRIEF DESCRIPTION OF THE DRAWINGS

These and various other features and advantages will become better understood upon reading of the following detailed description in conjunction with the accompanying drawings and the appended claims provided below, where:

DETAILED DESCRIPTION

Various embodiments of methods of making pixelated scintillators and image detectors comprising a pixelated scintillator layer are described. It is to be understood that the disclosure is not limited to the particular embodiments described as such may, of course, vary. An aspect described in conjunction with a particular embodiment is not necessarily limited to that embodiment and can be practiced in any other embodiments.

Embodiments of the disclosure may be described with reference to the figures. It should be noted that some figures are not necessarily drawn to scale. The figures are only intended to facilitate the description of specific embodiments, and are not intended as an exhaustive description or as a limitation on the scope of the disclosure. Further, in the following description, specific details such as examples of specific materials, dimensions, processes, etc. may be set forth in order to provide a thorough understanding of the disclosure. It will be apparent, however, to one of ordinary skill in the art that some of these specific details may not be employed to practice embodiments of the disclosure. In other instances, well known components or process steps may not be described in detail in order to avoid unnecessarily obscuring the embodiments of the disclosure.

All technical and scientific terms used herein have the meaning as commonly understood by one of ordinary skill in the art unless specifically defined otherwise. As used in the description and appended claims, the singular forms of "a," "an," and "the" include plural references unless the context clearly dictates otherwise. The term "or" refers to a nonexclusive "or" unless the context clearly dictates otherwise.

As used herein, the term "scintillator pixel," "pixelated scintillator array," or "pixelated scintillator layer" refers to embodiments where a scintillator piece is physically or optically isolated from adjoining scintillator pieces.

Methods of Fabricating Pixelated Scintillators

The disclosure provides a method of making pixelated scintillators. According to some embodiments of the method, a mesh array including a plurality of walls defining a plurality of cavities is provided. The walls of the mesh array may be coated with a reflective layer. An amorphous scintillator material in a molten state is provided and introduced into the plurality of cavities. The molten scintillator material may be poured over the mesh array to allow the molten scintillator material to flow into the plurality of cavities. Alternatively, the molten scintillator material may be placed over the mesh array and pressed into the plurality of cavities. The assembly may be cooled or annealed to form a pixelated scintillator array.

Figure 1A:
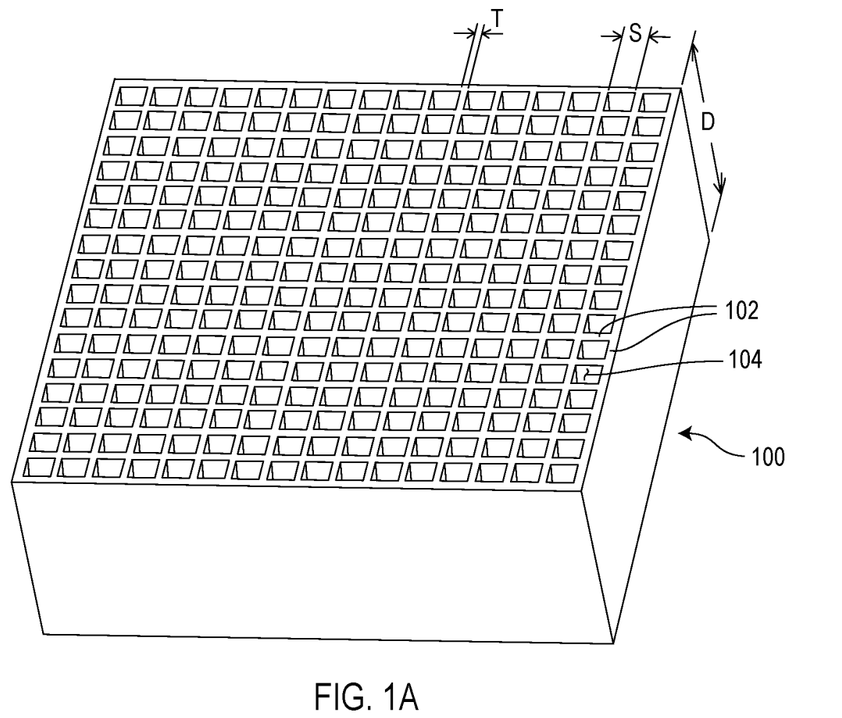
FIG. 1A is a perspective view of an exemplary mesh array according to embodiments of the disclosure.
Figure 1B:
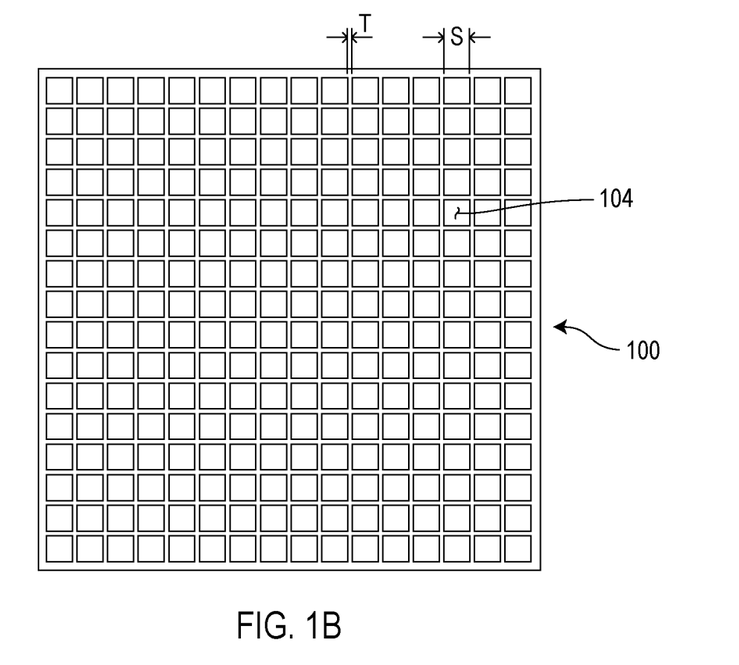
FIG. 1B is a top view of the mesh array shown in FIG. 1A according to embodiments of the disclosure.
Figure 2A:
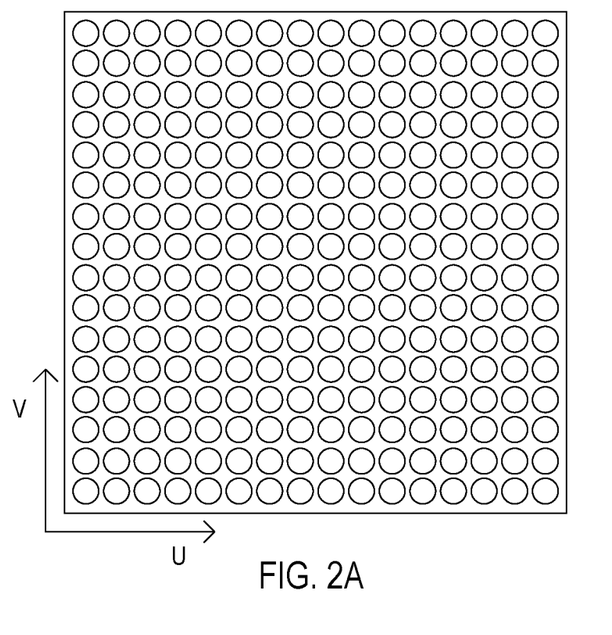
FIGS. 2A, 2B, and 2C are top views of exemplary mesh arrays according to alternative embodiments of the disclosure.
Figure 2B:
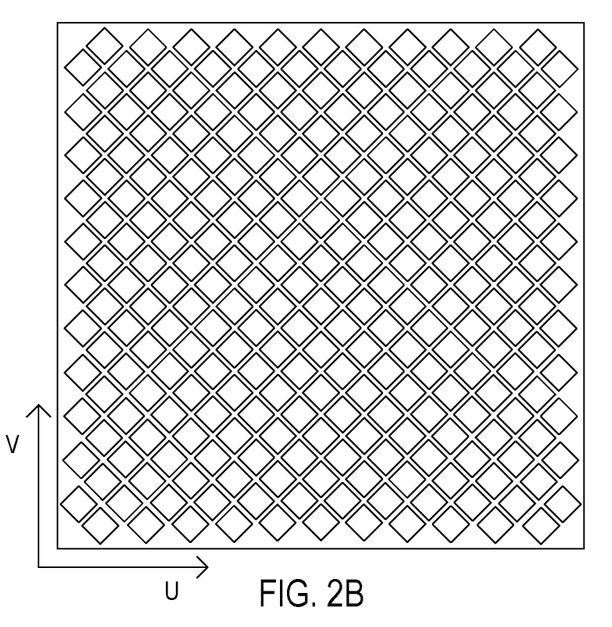
Figure 2C:
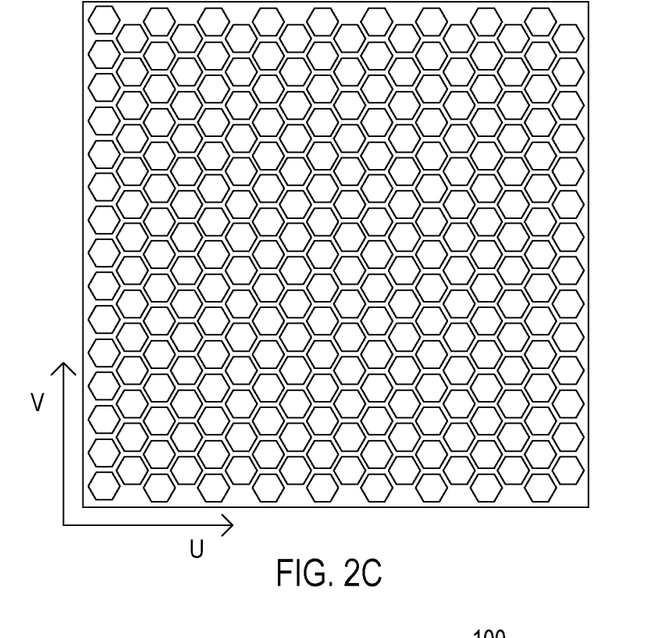

FIGS. 1A and 1B schematically show a mesh array 100 that can be used in the method according to some embodiments of the disclosure. The mesh array 100 may include a plurality of walls 102 defining a plurality of cavities 104. As shown, the plurality of cavities 104 may be arranged in rows and columns, each having a cross-section in the shape of a square or rectangle. It should be noted that the mesh array 100 shown in FIGS. 1A and 1B is provided for illustration purpose. Any other mesh arrays generally in the form of a grid can be used in the method of this disclosure. For example, the cross section of the cavities may be in the shape of a circle (FIG. 2A), diamond (FIG. 2B), hexagon (FIG. 2C), or any other regular or irregular shape. The cavities may be arranged in rows and columns as shown in FIGS. 1A and 1B. The cavities in adjacent rows and/or columns may also be arranged staggered, as shown FIGS. 2B and 2C, to improve sampling density. In FIGS. 2A, 2B and 2C, the u and v axes are the horizontal and vertical axes on the detector.

Referring to FIG. 1A, the spacing (S) between adjacent walls 102 may determine the size or surface area of the cavities 104, which in turn may determine the size of a pixel of the pixelated scintillator array formed. The thickness (T) of the walls 102 may determine the gap between adjacent cavities, which in turn may determine the pixel pitch of the pixelated scintillator array formed. The depth (D) of the walls may determine the thickness of the pixelated scintillator array formed. In some embodiments, two or more pixelated scintillator arrays formed may be further assembled to form a pixelated scintillator layer with a larger area as will be described in greater detail below in conjunction with description of other embodiments of the disclosure.

In exemplary embodiments, the mesh array 100 may be provided such that the pixelated scintillator array formed may have a pixel size ranging from about 0.05 mm to about 40 mm. In exemplary embodiments, the mesh array 100 may be provided such that the pixelated scintillator array formed may have a pixel pitch ranging from about 0.05 mm to about 40 mm. In exemplary embodiments, the mesh array 100 may be provided such that the pixelated scintillator array formed may have an aspect ratio (array thickness to pixel pitch) from about 1:1 to about 50:1. It should be noted that the above specific details are provided for a thorough understanding of the disclosure. It will be apparent to one of ordinary skill in the art that some of these specific details may not be required to practice embodiments of the disclosure.

The mesh array may be constructed from a material that has a melting temperature higher than the melting temperature of the scintillator material used. In some embodiments, the mesh array may be constructed from a material having a thermal expansion coefficient substantially similar to or smaller than the thermal expansion coefficient of the scintillator material used.

The mesh array 100 may be constructed from a metal or metal alloy. Suitable metals or metal alloys that can be used to construct the mesh array include and are not limited to Cupronickel, Hastalloy C, Inconel, Iridium, Iron, Monel, Molybdenum, Steel, Steel and Carbon alloy, Tantalum, Thorium, Titanium, Tungsten, Vanadium, Zirconium, and so on.

In alternative embodiments, the mesh array 100 may be constructed from ceramics. Suitable ceramics that can be used to construct the mesh array include and are not limited to $HfB_2$, HfC, NfN, $ZrB_2$, ZrC, ZrN, $TiB_2$, TiC, TiN, $TaB_2$, TaC, TaN, SiC, and so on.

Other materials suitable for constructing the mesh array include graphite, silicon carbide, or boron nitride.

The mesh array 100 can be manufactured using precision electrical discharge machining (EDM), stereolithography, or other suitable techniques known in the art.

The mesh array 100, or at least the surfaces of the walls 102 defining the cavities 104 of the mesh array 100, may be applied with a reflective coating. The reflective coating may be applied to the wall surfaces using deposition, sputtering, spray, plating, or any other suitable techniques known in the art.

The color of diffuse reflector coatings may be white or a color matching the wavelength(s) of the emitted light from the scintillator. Exemplary reflective coating includes $TiO_2$. Other reflective coatings include specular reflectors such as silver, gold, or aluminum depending on the melting temperature of the scintillator materials used. Wrappings such as aluminized Mylar® and ESR Vikuiti® may also be bonded as reflector materials to scintillators.

The scintillator material used in the method of this disclosure may be an amorphous scintillator material. Any suitable amorphous scintillator materials that melt at a temperature below the melting temperature of the mesh array can be used.

Exemplary scintillator materials include and are not limited to borate glasses incorporated with terbium oxides and silicate glasses incorporated with terbium oxides. Other elements or compounds that can be incorporated in the borate or silicate glasses include gadolinium oxides, cerium oxides, or europium oxides, etc. By way of example, the scintillating borate or silicate glasses may include 1-20 percent of terbium oxides, 1-15 percent gadolinium oxides, and certain percent of other oxides. Other suitable ingredients such as stabilizers and flux etc. may also be included in the scintillator glasses. U.S. Pat. Nos. 5,108,959, 5,120,970, 5,122,671, and 5,391,320 disclose various silicate and borate scintillator glasses, the disclosures of all of which are incorporated herein by reference in their entirety.

Other exemplary scintillator materials include scintillating nanoparticles embedded in an amorphous base material. The nanoparticles are preferably nanospheres having diameters smaller than the wavelength of the emitted light to reduce scatter centers and re-absorption. Plastic scintillator materials such as poly vinyl toluene (PVT) embedded with various scintillating dopants can also be used. In general, dopants in the amorphous base material control the emission spectra and decay time. Plastic scintillator materials are commercially available e.g. from Saint-Gobain of Hiram, Ohio, United States.

According to embodiments of the disclosure, solid amorphous scintillator materials may be heated e.g. in a furnace at elevated temperatures to provide a molten glass or an amorphous scintillator material in a molten state. The hot liquid glass can be poured over a mesh array shown in FIGS. 1A-2C, to allow the hot liquid glass to flow into the cavities. The assembly can be then annealed or cooled over a period of time at certain temperatures to relieve thermal stress, forming a pixelated scintillator array.

According to alternative embodiments of the disclosure, solid amorphous scintillator materials may be heated e.g. in a furnace at elevated temperatures to provide a molten glass or an amorphous scintillator material in a molten state. The molten glass, which may be in the form of a soft glass blob, is placed over a mesh array shown in FIGS. 1A-2C. The soft glass blob can be pressed e.g. using a plunger, to allow the molten glass to be distributed or filled into the cavities of the mesh array. The assembly can be then annealed or cooled over a period of time at certain temperatures to relieve thermal stress, forming a pixelated scintillator array.

Alternative Methods of Fabricating Pixelated Scintillators

The disclosure further provides an alternative method of making pixelated scintillators. According to the alternative embodiment, a scintillator material in a molten state is provided. A plurality of scintillator pixels are formed by drawing from the molten scintillator material. If desired, the scintillator pixels may be fire polished. A reflective layer may be applied on each of the plurality of scintillator pixels formed. The plurality of scintillator pixels applied with a reflective layer can be assembled to form a pixelated scintillator array.

The plurality of scintillator pixels may be assembled by inserting the drawn pixels into a mesh array. The mesh array may include a plurality of walls defining a plurality of cavities configured to receive the plurality of scintillator pixels. The plurality of scintillator pixels may be fixed in the mesh array using an adhesive. For example, a potting material or glue can be melted in the plurality of cavities to hold the scintillator pixels in place. It is desirable that the glue is transparent.

The mesh array used in the alternative method described herein may be the same as or similar to the mesh array shown in FIGS. 1A-2C described above. For example, the cavities may be aligned in rows and columns, each having a cross-section in the shape of a square, rectangle, circle, diamond, hexagon, or any other regular or irregular shape. The cavities in adjacent rows and/or columns may also be arranged staggered to improve sampling density. The materials for constructing the mesh array described above can be used for the mesh array used in the alternative method described herein. For example, the mesh array may be constructed from a material that has a melting temperature higher than the melting temperature of the scintillator material used. The mesh array may be constructed from a material having a thermal expansion coefficient substantially similar to or smaller than the thermal expansion coefficient of the scintillator material used.

In some embodiments, the mesh array used in the alternative method described herein can be constructed from a material different from the material for constructing the mesh array used in the method described above. Because the scintillator pixels are formed by drawing from the molten scintillator material and then inserted into the mesh array in the alternative method, as opposed to by pouring or pressing the hot molten material into the cavities of the mesh array, it is not required that materials for constructing the mesh array have a melting temperature higher than the melting temperature of the scintillator material. As such, materials other than, or in addition to, metals or metal alloys, ceramics, or other materials described above, can be used. For example, metal aluminum, which has high reflectivity, may be used in the alternative method of making pixelated scintillator arrays.

In alternative embodiments, the scintillator pixels coated with a reflective layer may be assembled by binding them to each other using an adhesive, or held in place through attachments to the top or bottom portions of individual scintillator pixels drawn.

The scintillator material used in the alternative method may be the same as the material used in the method described above. For example, amorphous scintillator materials such as borate or silicate glasses incorporated with terbium oxides may be used. Other suitable scintillator materials include scintillating nanoparticles embedded in an amorphous base material, and plastic scintillator materials such as poly vinyl toluene (PVT) embedded with various scintillating dopant materials.

The scintillator pixels may be drawn or formed using a standard glass drawing technique. Various glass drawing techniques are known in the art and therefore their detailed description is omitted herein in order to focus on description of embodiments of this disclosure. In general, an amorphous scintillator material may be heated in a furnace at elevated temperatures to provide a molten glass or an amorphous scintillator material in a molten state. The molten glass may then pass through a bushing plate including one or more fine orifices. The molten glass passes through the fine orifices and come out as fine filaments or scintillator pixels. The orifices in the bushing plate may have a size and shape designed to allow formation of scintillator pixels with a desired size and shape. A reflective coating may be applied to the drawn pixels by spray, deposition or other suitable means. Optionally, the drawn scintillator pixels may be fire polished and then applied with a reflective coating. It should be noted that any other glass drawing apparatuses and techniques may be used to make the scintillator pixels. For example, scintillator pixels may be pulled or drawn from softened molten glass or preform.

The scintillator pixels may be drawn in various kinds of forms or shapes. For example, the scintillator pixels may have a cross-sectional shape of a circle, square, rectangle, hexagon, and other regular or irregular shape. In some embodiments, the scintillator pixels may be drawn into the form of cylinders to maximize the area of interface between the scintillator pixels and their surroundings such as air or the mesh array, thus maximizing the differences in index of refraction, to enhance the probability for total internal reflection. The scintillator pixels can be drawn to various lengths and cross-sectional sizes for different applications. For example, it is possible to draw scintillator cylinders to a diameter of 6 microns in some cases. Scintillator pixels with small sizes may reduce the light output to an unusual value when the aspect ratio (height to pitch) becomes too large. In general, the aspect ratio may range from about 1:1 to about 50:1, or from about 33:1 to about 7.7:1.

Pixelated Scintillators and X-Ray Imagers Including Same

Figure 3:
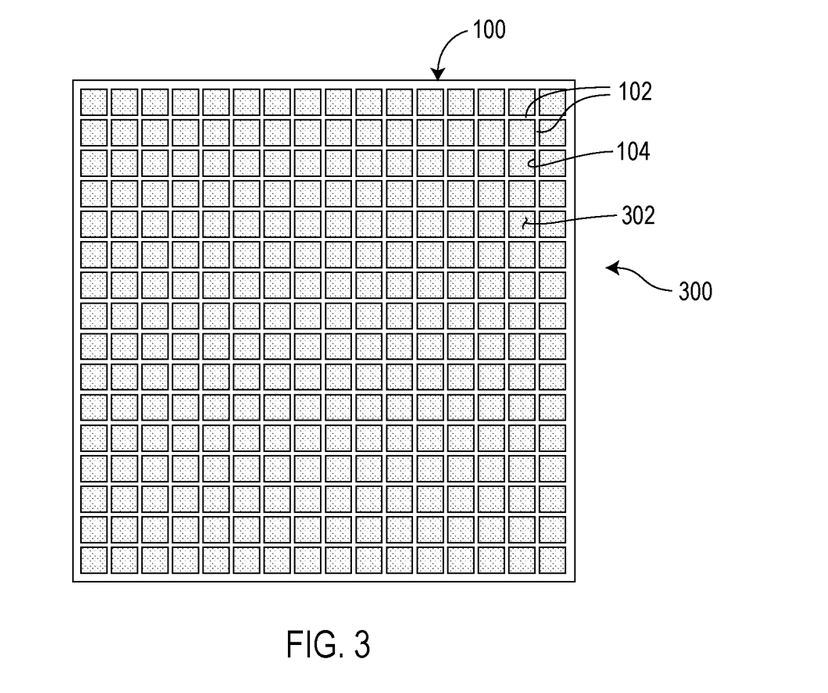
FIG. 3 is a top view of an exemplary pixilated scintillator array according to embodiments of the disclosure.

In another aspect, the disclosure provides a pixelated scintillator array. The pixelated scintillator array includes a mesh array having a plurality of walls defining a plurality of cavities, and a plurality of scintillator pixels in the plurality of cavities. The scintillator pixels are formed of an amorphous scintillator material. FIG. 3 shows an exemplary pixelated scintillator array 300 according to embodiments of this disclosure. The pixelated scintillator array 300 includes a mesh array 100 having a plurality of walls 102 defining a plurality of cavities 104, and plurality of scintillator pixels 302 (grayed) received in the plurality of cavities 104. The pixelated scintillator array 300 shown in FIG. 3 may be used alone or as a scintillator block in a scintillator layer of an image detector.

The cavities 104 of the mesh array 100 may be arranged in rows and columns, each having a cross-section in the shape of a square, rectangle, circle, diamond, hexagon, or any other regular or irregular shape. The cavities 104 may be aligned in rows and columns. The cavities 104 in adjacent rows and/or columns may also be arranged staggered to improve sampling density. The mesh array 100 may be constructed from a material that has a thermal expansion coefficient similar to or smaller than the thermal expansion coefficient of the scintillator material. The mesh array 100 may be constructed from a material having a melting temperature higher than the melting temperature of the amorphous scintillator material. Alternatively, the mesh array 100 may be constructed from a material having a melting temperature that is the same as or smaller than the melting temperature of the amorphous scintillator material. The mesh array 100 may be constructed from a metal or metal alloy, a ceramic, graphite, silicon carbide, or boron nitride, etc. The mesh array, or at least the inside surfaces of the walls defining the cavities, may be coated with a reflective coating.

The scintillator pixels 302 may be formed of an amorphous scintillator material such as silicate or borate glasses incorporated with terbium oxides, scintillating nanoparticles embedded in an amorphous base material, and plastic scintillator materials such as poly vinyl toluene (PVT) embedded with various dopant materials.

Figure 4:
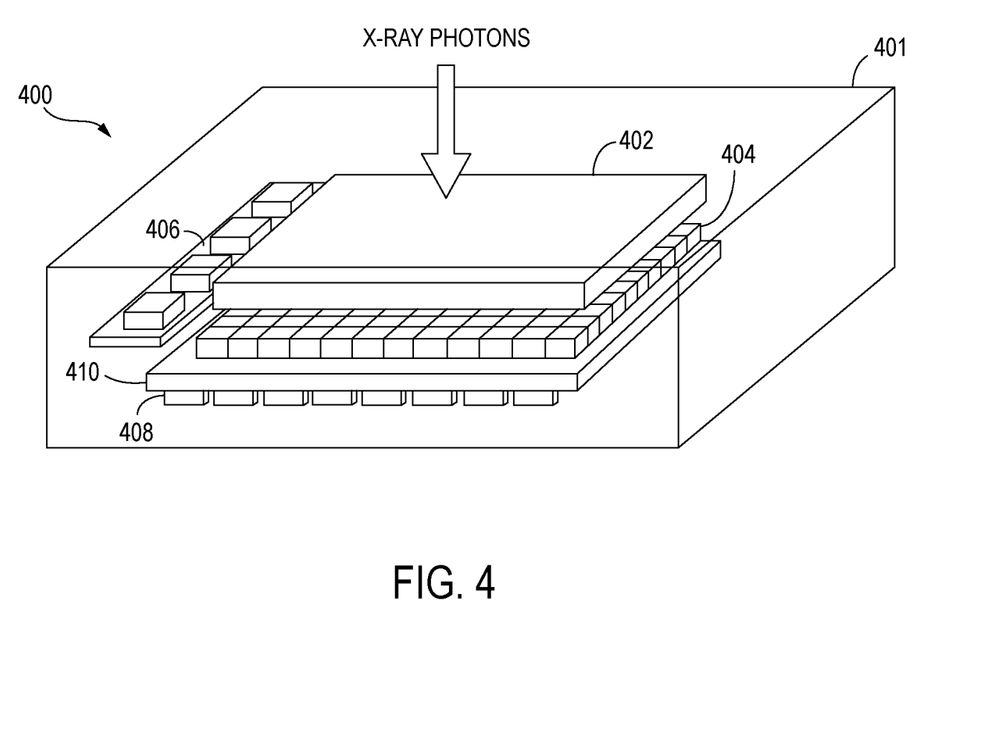
FIG. 4 schematically shows an exemplary x-ray image detector according to embodiments of the disclosure.

In a further aspect, the disclosure provides an x-ray image detector. FIG. 4 schematically shows an exemplary x-ray image detector 400 according to embodiments of the disclosure. The x-ray image detector 400 includes a pixelated scintillator layer 402 and a detector array 404. The pixelated scintillator layer 402 generates light photons from x-ray radiation. The pixelated scintillator layer 402 may include one or more scintillator arrays described above.

The detector array 404 converts light photons generated in the pixelated scintillator layer 402 to electrical signals. Various detector arrays are known and therefore their detailed description is omitted here in order to focus on description of embodiments of this disclosure. In general, a detector array may include a large number e.g. hundreds of thousands or millions of detector elements. The large number of detector elements may be arranged in a plurality of rows and a plurality of columns forming an active detector area. Each detector element may include an addressable photosensitive element such as a photodiode and a switching transistor such as a TFT or CMOS transistor.

The image detector 400 may also include a driver control 406 and a readout control 408. The driver control 406 provides control signals for addressing the signal data generated by the detector array 404. The readout control 408 provides control signals for reading out the signal data. In the exemplary embodiment shown in FIG. 4, the detector array 404 and the readout control assembly 408 are mounted on opposing sides of a base plate 410 to minimize the lateral size of the image detector 400. The driver control assembly 406 may also be placed beneath the detector array 404, or the readout control assembly 408 may be placed at a side of the detector array 404. A housing 401 encloses the pixelated scintillator layer 402, the detector array 404, the driver control assembly 406, and the readout control assembly 408. The image detector 400 may further include other electronics for amplifying, digitizing, and processing the electrical signals as known in the art. U.S. Pat. Nos. 5,970,115, 7,291,842, 7,816,651 and 8,552,386 disclose various embodiments of x-ray imaging apparatuses, systems, and electronic components thereof, the disclosures of all of which are incorporated herein by reference in their entirety.

Alternative Embodiments

An x-ray imager may be used with an x-ray source that generates x-rays of cone-beam or fan-beam. X-rays of cone-beam or fan-beam may have a centerline passing through the x-ray source. The peripheral portions of the x-rays of cone-beam or fan-beam form angles with respect to the centerline.

In conventional x-ray imaging systems using pixelated scintillator layers, all of the scintillator pixels are vertically aligned in parallel with the centerline of x-rays. In such a system, although the central portion of x-rays may pass through single scintillator pixels when propagating in the scintillator layer, the peripheral portions of x-rays may cross through multiple pixels. As a result, the resolution of the imaging system is degraded. This issue becomes severer when the thickness of the scintillator layer increases in imaging systems for use with x-rays having e.g. MV energy levels.

According to embodiments of the disclosure, a pixelated scintillator layer may include two or more pixelated scintillator blocks or arrays. A first pixelated scintillator array may include a plurality of scintillator pixels arranged substantially in parallel in a first direction. A second pixelated scintillator array may include a plurality of scintillator pixels arranged substantially in parallel in a second direction different from the first direction. The first and second pixelated scintillator arrays may be arranged such that the first and second directions focus at an x-ray source or form a non-zero angle at the x-ray source.

Figure 5:
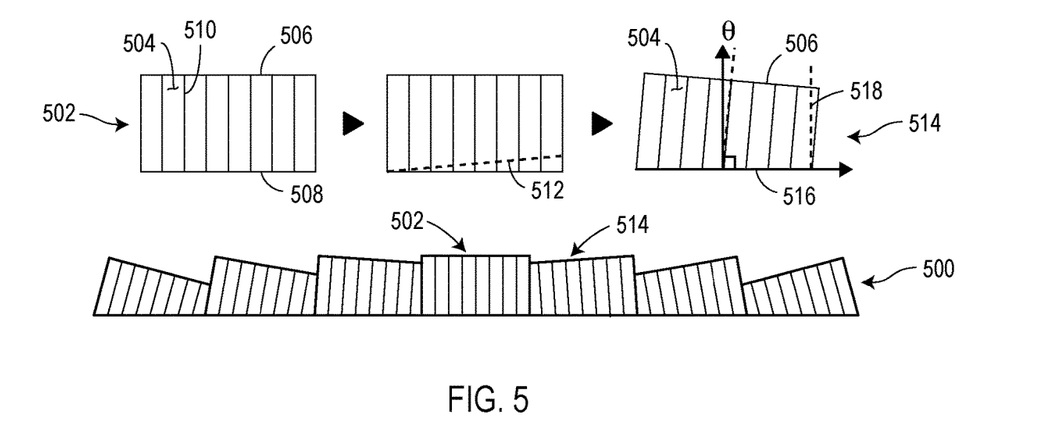
FIG. 5 schematically shows an exemplary pixelated scintillator layer and a method of making the same according to embodiments of the disclosure.

FIG. 5 is a cross-sectional side view of an exemplary pixelated scintillator layer 500 and shows a method of making the same according to embodiments of the disclosure. As shown, a first pixelated scintillator array 502 comprising a plurality of scintillator pixels 504 is provided. The first pixelated scintillator array 502 has a top surface 506 and a bottom surface 508. As provided, the top and bottom surfaces 506, 508 may be substantially parallel. The plurality of scintillator pixels 504 are aligned substantially in parallel to each other and substantially perpendicular to the top and bottom surfaces 506, 508. Between the adjoining scintillator pixels 504 is a reflective layer or septa 510.

The plurality of scintillator pixels 504 may be formed from either an amorphous scintillator material or a crystalline scintillator material. A pixelated scintillator array comprising an amorphous scintillator material can be made using a method described above under "Method of Fabricating Pixelated Scintillators" or using a glass drawing technique described above under "Alternative Method of Fabricating Pixelated Scintillators" of this disclosure. A pixelated scintillator array comprising a crystalline scintillator material can be made using a "slice and dice" technique known in the art.

The first pixelated scintillator array 502 may be cut along a plane near the bottom surface 508 as indicated by the dashed line 512, forming a second pixelated scintillator array 514. The second pixelated scintillator array 514 formed is thus has a new bottom surface 516 non-parallel to the top surface 506. The plurality of scintillator pixels 504, while still substantially perpendicular to the top surface 506, become non-perpendicular to the newly formed bottom surface 516. When the second pixelated scintillator array 514 is placed with the bottom surface 516 on a horizontal plane, an angle (θ) is formed between the vertical axis and the pixel aligning direction. The degree of the angle (θ) depends on the angle of the cutting plane 512 with respect to the bottom surface 508 of the first pixelated scintillator array 502.

The side of the formed second pixelated scintillator array 514 may be further cut along the plane indicated by dash line 518 so that when a first pixelated scintillator array 502 and a second pixelated scintillator array 514 are assembled in forming a pixelated scintillator layer 500, the second scintillator array 514 may be disposed in close proximity with the first scintillator array 502, leaving no substantial gap between the sides of two adjoining scintillator arrays, and still allowing the scintillator pixels of the second scintillator array 514 to lean toward the x-ray source.

A plurality of first scintillator arrays 502 may be cut, with varying cutting angles, forming a plurality of second scintillator arrays 514 having varying degrees of angles between the newly formed bottom surface and top surface. The plurality of second pixelated scintillator arrays 514 may be assembled with a first scintillator array 502, forming a pixelated scintillator layer 500, as shown in FIG. 5. As assembled, the aligning directions of scintillator pixels 504 in each of the scintillator array 502, 514 may be focused on an x-ray source (pixel-wise focusing at the source). When in use, x-rays of cone-beam or fan-beam produced by the x-ray source may pass single scintillator pixels when propagating in the scintillator layer 500, without crossing through neighboring scintillator pixels. This can advantageously increase spatial resolution of the imaging system.

Figure 6:
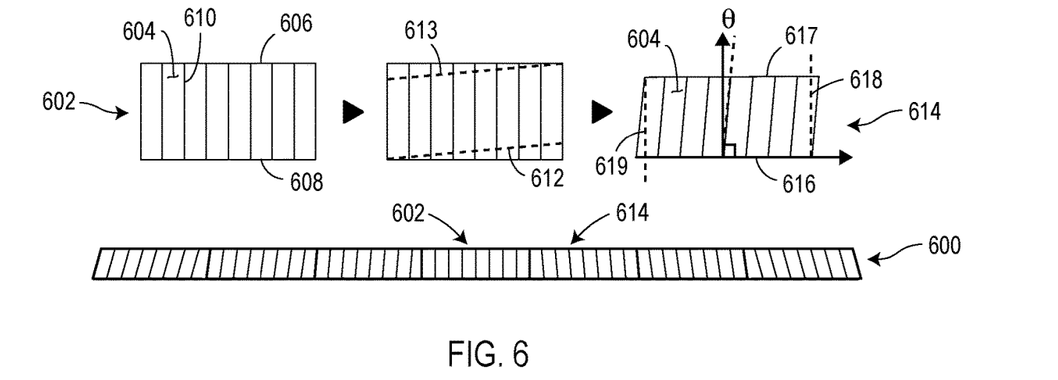
FIG. 6 schematically shows an alternative pixelated scintillator layer and a method of making the same according to embodiments of the disclosure.

FIG. 6 is a cross-sectional side view of an alternative pixelated scintillator layer 600 and a method of making the same according to alternative embodiments of the disclosure. The pixelated scintillator layer 600 shown in FIG. 6 is similar to the pixelated scintillator layer 500 shown in FIG. 5 in some aspects. For example, the first pixelated scintillator array 602 has a top surface 606 and a bottom surface 608 substantially parallel to each other. The plurality of scintillator pixels 604 of the first pixelated scintillator array 602 are aligned substantially in parallel to each other and substantially perpendicular to both the top and bottom surfaces 606, 608. Between adjoining scintillator pixels 604 is a reflective layer or septa 610. The plurality of scintillator pixels 604 may be formed from either an amorphous scintillator material or a crystalline scintillator material.

In comparison with FIG. 5, the second pixelated scintillator array 614 in FIG. 6 has a different shape or configuration. As shown in FIG. 6, the top and bottom surfaces 616, 617 of the second pixelated scintillator array 614 are parallel to each other. However, the pixels 604 of the second pixelated scintillator array 614, while still substantially in parallel to each other, are non-perpendicular to both the top and bottom surfaces 616, 617.

Still referring to FIG. 6, the first pixelated scintillator array 602 may be cut along both a plane near the bottom surface 508 as indicated by the dashed line 612 and a plane near the top surface 606 as indicated by the dashed line 613. The second pixelated scintillator array 614 formed is thus has a new bottom surface 616 and a new top surface 617. The newly cut top and bottom surfaces 616, 617 may still be parallel to each other. However, the aligning direction of the scintillator pixels 604 becomes non-perpendicular to both the top and bottom surfaces 616, 617. When the second pixelated scintillator array 614 is placed with the bottom surface 616 on a horizontal plane, an angle (θ) is formed between the vertical axis and the pixel aligning direction. The degree of the angle (θ) depends on the angle of the cutting plane with respect to the bottom surface 608 of the first pixelated scintillator array 602.

Still referring to FIG. 6, one or both sides of the second pixelated scintillator array 614 may be further cut along planes indicated by dash lines 618, 619 so that when a first pixelated scintillator array 602 and a second pixelated scintillator array 614 are assembled in forming a pixelated scintillator layer 600, the second scintillator array 614 may be disposed in close proximity with the first scintillator array 602, leaving no substantial gap between the sides of two adjoining scintillator arrays, and still allowing the aligning direction of the scintillator pixels 604 of the second scintillator array 614 to lean toward the x-ray source.

A plurality of first scintillator arrays 602 may be cut, with varying cutting angles, forming a plurality of second scintillator arrays 614 having varying degrees of angles between the newly formed bottom surface and the pixel aligning direction. The plurality of second pixelated scintillator arrays 614 may be assembled with the first scintillator array 602, forming a pixelated scintillator layer 600, as shown in FIG. 6. As assembled, the aligning directions of scintillator pixels 604 in each of the scintillator arrays 602, 614 may be focused on an x-ray source. When in use, x-rays of cone-beam or fan-beam produced by the x-ray source may pass single scintillator pixels when propagating in the scintillator layer 600, without crossing through neighboring scintillator pixels. This can advantageously increase spatial resolution of the imaging system.

Methods of making pixelated scintillators, pixelated scintillator arrays, and image detectors including pixelated scintillators have been described. Those skilled in the art will appreciate that various other modifications may be made within the spirit and scope of the invention. All these or other variations and modifications are contemplated by the inventors and within the scope of the invention.

What is claimed is:

1. A pixelated scintillator layer, comprising:
    a first pixelated scintillator array including a plurality of scintillator pixels arranged substantially in parallel in a first direction; and
    a second pixelated scintillator array including a plurality of scintillator pixels arranged substantially in parallel in a second direction, the second direction being different from the first direction; wherein
        a top surface of the second pixelated scintillator array is unparallel with a bottom surface of the second pixelated scintillator array,
        a side of the second pixelated scintillator array is parallel to a side of the first pixelated scintillator array, and
        the first pixelated scintillator array and the second pixelated scintillator array are arranged such that the first direction and the second direction focus substantially at a source.

2. The pixelated scintillator layer of claim 1, wherein the first pixelated scintillator array has a top surface proximal to the source and a bottom surface opposite to the top surface, the top surface and the bottom surface of the first pixelated scintillator array being substantially parallel; and
    the top surface of the second pixelated scintillator array proximal to the source.

3. The pixelated scintillator layer of claim 2, wherein the top surface of the second pixelated scintillator array is substantially perpendicular to the second direction.

4. The pixelated scintillator layer of claim 3, wherein the second pixelated scintillator array comprises a plurality of pixelated scintillator arrays generally symmetrically arranged with respect to the first pixelated scintillator array.

5. The pixelated scintillator layer of claim 4, further comprising:
    a plurality of reflective layers each being sandwiched between adjacent scintillator pixels of the first pixelated scintillator array and the second pixelated scintillator array.

6. The pixelated scintillator layer of claim 1, wherein the second pixelated scintillator array comprises a plurality of pixelated scintillator arrays, the plurality of pixelated scintillator arrays of the second pixelated scintillator array and the first pixelated scintillator array collectively forming a generally concave profile facing the source.

7. The pixelated scintillator layer of claim 1, wherein the plurality of scintillator pixels of the first pixelated scintillator array and the second pixelated scintillator array comprise an amorphous scintillator material.

8. The pixelated scintillator layer of claim 1, wherein the plurality of scintillator pixels of the first pixelated scintillator array and the second pixelated scintillator array comprise a crystalline scintillator material.

9. The pixelated scintillator layer of claim 1, wherein the second pixelated scintillator array comprises a plurality of pixelated scintillator arrays generally symmetrically arranged with respect to the first pixelated scintillator array.

10. The pixelated scintillator layer of claim 9, further comprising
    a plurality of reflective layers each being sandwiched between adjacent scintillator pixels of the first pixelated scintillator array and the second pixelated scintillator array.

11. The pixelated scintillator layer of claim 1, wherein the second pixelated scintillator array is formed by
    making a first cut along a first plane adjacent to the bottom surface of the second pixelated scintillator array such that the top surface of the second pixelated scintillator array is unparallel with the bottom surface, and
    making a second cut along the side of the second pixelated scintillator array such that the side is parallel to the side of the first pixelated scintillator array.

* * * * *